US007788347B2

(12) United States Patent
Trollope (10) Patent No.: US 7,788,347 B2
(45) Date of Patent: Aug. 31, 2010

(54) METHOD AND APPARATUS FOR CONFIGURING A NETWORK NODE USING MULTIPLE PEER-TO-PEER LAYERS

(75) Inventor: David Steven Trollope, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1128 days.

(21) Appl. No.: 10/956,870

(22) Filed: Sep. 30, 2004

(65) Prior Publication Data

US 2006/0072468 A1    Apr. 6, 2006

(51) Int. Cl.
*G06F 15/16* (2006.01)
(52) U.S. Cl. .................... 709/220; 709/221; 709/227
(58) Field of Classification Search ......... 709/220–224, 709/227
See application file for complete search history.

(56) References Cited

U.S. PATENT DOCUMENTS

| 7,206,841 | B2 * | 4/2007 | Traversat et al. ............ 709/225 |
| 7,263,070 | B1 * | 8/2007 | Delker et al. ................ 370/254 |
| 7,321,928 | B2 * | 1/2008 | Feltin et al. ................. 709/223 |

* cited by examiner

*Primary Examiner*—Yemane Mesfin
(74) *Attorney, Agent, or Firm*—Fay Sharpe LLP (57) ABSTRACT

This invention relates to a method and apparatus for a method and apparatus for configuring a network node using multiple peer-to-peer layers. More particularly, the invention relates to a system that can incorporate into a network and retrieve all operational data from the network using non-centralized peer-to-peer network techniques. Implementation of these embodiments will remove the need for a central network node and administration, while simultaneously supporting multiple network interfaces, e.g., interfaces between virtual networks. A network node or device configures itself based on other nodes already present on the network.

6 Claims, 4 Drawing Sheets

METHOD AND APPARATUS FOR CONFIGURING A NETWORK NODE USING MULTIPLE PEER-TO-PEER LAYERS

BACKGROUND OF THE INVENTION

This invention relates to a method and apparatus for configuring a network node using multiple peer-to-peer layers. More particularly, the invention relates to a system that allows a new network device to be incorporated into a network and retrieve all operational data from the network—using non-centralized, peer-to-peer network techniques. Implementation of these embodiments will remove the need for a central network node and central administration, while simultaneously supporting multiple network interfaces, e.g., interfaces between virtual networks. The new network node or device configures itself based on other nodes already present on the network.

While the invention is particularly directed to the art of configuring using peer-to-peer principles in a telecommunication network and/or internet environment, and will be thus described with specific reference thereto, it will be appreciated that the invention may have usefulness in other fields and applications. For example, the invention may be used in other network architectures and environments where a transfer and distribution of administrative responsibilities is desired.

Figure 1:
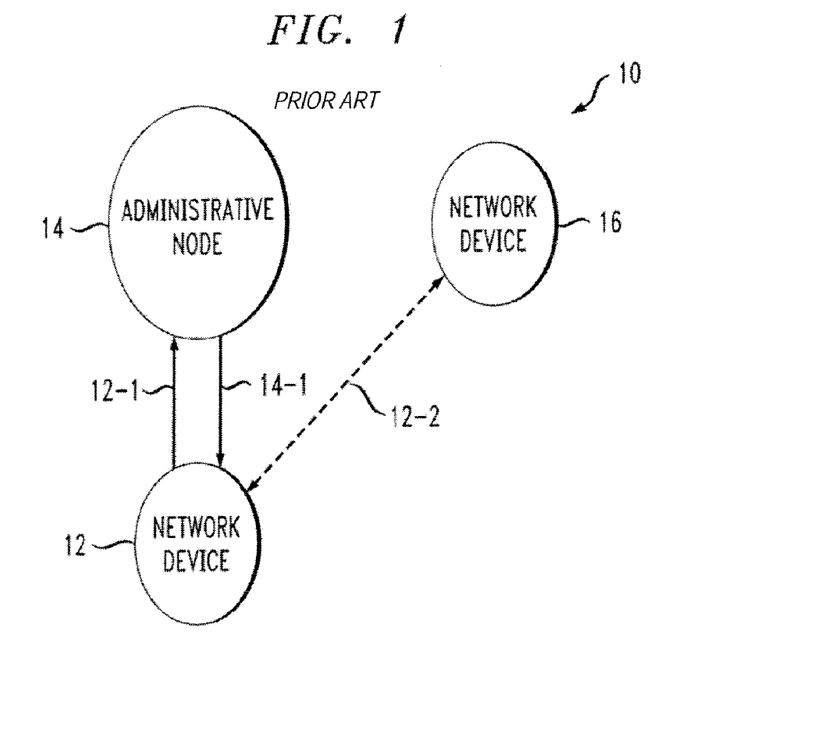
FIG. 1 is a schematic illustration of a prior art network.

By way of background, known networks typically utilize a centralized topology. In this regard, with reference to FIG. 1, a network 10 includes a new network device 12, an administrative node 14, and an existing network device 16. As is known, when a new network device 12 is introduced into the network, it must register with an appropriate administrative node 14 (at line 12-1). Administrative node 14 then responds to the network device 12 with a confirmation or acknowledgement of registration (at 14-1). A network device 12 is then able to communicate with other network devices such as network device 16 and complete, for example, service data transfers (at 12-2).

This network topology is limited inasmuch as it requires centralization of administrative functions and other functions used to provide service in the network. While the centralized system allows the service provider to maintain central control of a variety of devices, central control is not always desired. In addition, incorporating a new network device into a network requires the pre-provisioning of copies of data (of many forms) held in other network devices Some non-centralized, peer-to-peer networks are known. For example, music sharing services are known which utilize peer-to-peer networks. Network independent service frameworks are also known entities.

However, there are no known prior systems (peer-to-peer or centralized) that combine peer-to-peer network topologies for multiple services, administrative delegation, data evolution, and network/service registration/control in one device that is self-configuring within a network.

The present invention contemplates a new and improved system that resolves the above-referenced difficulties and others.

SUMMARY OF THE INVENTION

A method and apparatus for configuring a network node using multiple peer-to-peer layers are provided.

In one aspect of the invention, a method comprises sending a request for registration to a second network device, determining whether the second network device is operative to process the request for registration, processing the request for registration by the second network device if a determination is made that it is operative to process the request for registration, forwarding the request for registration to a third network element if the second network element is inoperative to process the request for registration, the third network device being operative to process the request for registration, processing the request for registration by the third network device, sending an acknowledgement of successful registration to the new network device by the third network device, the acknowledgement including information on other network devices that are operative to perform administrative functions, requesting administrative information by the new network device from selected ones of the other network devices that are operative to perform administrative functions, and, providing the administrative information to the new network device.

In another aspect of the invention, the method further comprises providing services by the new network device based on the administrative information.

In another aspect of the invention, the method further comprises performing selected administrative functions by the new network device based on the administrative information.

In another aspect of the invention, the selective administrative functions include at least one of registering users on the network and delegating administrative functions.

In another aspect of the invention, a system comprises means for sending a request for registration to a second network device, means for determining whether the second network device is operative to process the request for registration, means for processing the request for registration by the second network device if a determination is made that it is operative to process the request for registration, means for forwarding the request for registration to a third network element if the second network element is inoperative to process the request for registration, the third network device being operative to process the request for registration, means for processing the request for registration by the third network device, means for sending an acknowledgement of successful registration to the new network device by the third network device, the acknowledgement including information on other network devices that are operative to perform administrative functions, means for requesting administrative information by the new network device from selected ones of the other network devices that are operative to perform administrative functions, and, means providing the administrative information to the new network device.

In another aspect of the invention, the system further comprises means for providing services by the new network device based on the administrative information.

In another aspect of the invention, the system further comprises means for performing selected administrative functions by the new network device based on the administrative information.

In another aspect of the invention, the means for selective administrative functions include at least one of means for registering users on the network and means for delegating administrative functions.

In another aspect of the invention, the system comprises a first network device operative to send a request for registration to the second network device, a second network device operative to determine whether the second network device is operative to process the request for registration, process the request for registration by the second network device if a determination is made that the second network device is operative to process the request for registration, and forward the request for registration to a third network element if the second network element is inoperative to process the request for registration and a third network device operative to process the request for registration by the third network device and send an acknowledgement of successful registration to the first network device.

In another aspect of the invention, the first network device is operative to request administrative information from selected other network devices that are operative to perform administrative functions.

In another aspect of the invention, the request is based on the acknowledgement, the acknowledgement including information on the other network devices that are operative to perform administrative functions.

In another aspect of the invention, the selected other network devices are operative to provide the administrative information to the first network device.

In another aspect of the invention, a network comprises a first network device being operative to request administrative information from selected network devices that are operative to perform administrative functions and at least one of the selected network devices being operative to provide the administrative information to the first network device.

In another aspect of the invention, the first network device is operative to provide services based on the administrative information.

In another aspect of the invention, the first network device is operative to perform selected administrative functions based on the administrative information.

In another aspect of the invention, the selective administrative functions include at least one of registering users on the network and delegating administrative functions.

In another aspect of the invention, a method comprises sending a request for registration by the first network device to a second network device, determining whether the second network device is operative to process the request for registration, processing the request for registration by the second network device if a determination is made that the second network device is operative to process the request for registration, forwarding the request for registration to a third network element if the second network element is inoperative to process the request for registration, the third network device being operative to process the request for registration, processing the request for registration by the third network device and sending an acknowledgement of successful registration to the new network device by the third network device.

In another aspect of the invention, a method comprises requesting administrative information by a first network device from other network devices that are operative to perform administrative functions and providing the administrative information to the first network device by selected ones of the other network devices.

In another aspect of the invention, the method further comprises providing services by the first network device based on the administrative information.

In another aspect of the invention, the method further comprises performing selected administrative functions by the first network device based on the administrative information.

In another aspect of the invention, the selective administrative functions include at least one of registering users on the network and delegating administrative functions.

An advantage of the present invention is that a new network device provides decentralized control through delegation and service update notifications. No one addressable network device is required for network or service authorization.

Another advantage of the present invention is that all network device provisioning may occur utilizing data already on the network, instead of pre-provisioning the device. The evolution of data while delegating administrative functions allow transformation of data to be relative to the device from which it came.

Another advantage of the present invention is that a new device provides a framework for multiple services to be tied through the administrative process.

Another advantage of the present invention is that a network device can be deployed very quickly with little effort prior to activation.

Another advantage of the present invention is that a network device with no central administration function has improved reliability because no one or two node failures can render the network or services inoperable.

Another advantage of the present invention is that common registration and administration processes provide a framework for manufacturers to build multifunction devices without the complexity of reimplementation for each function.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 2:
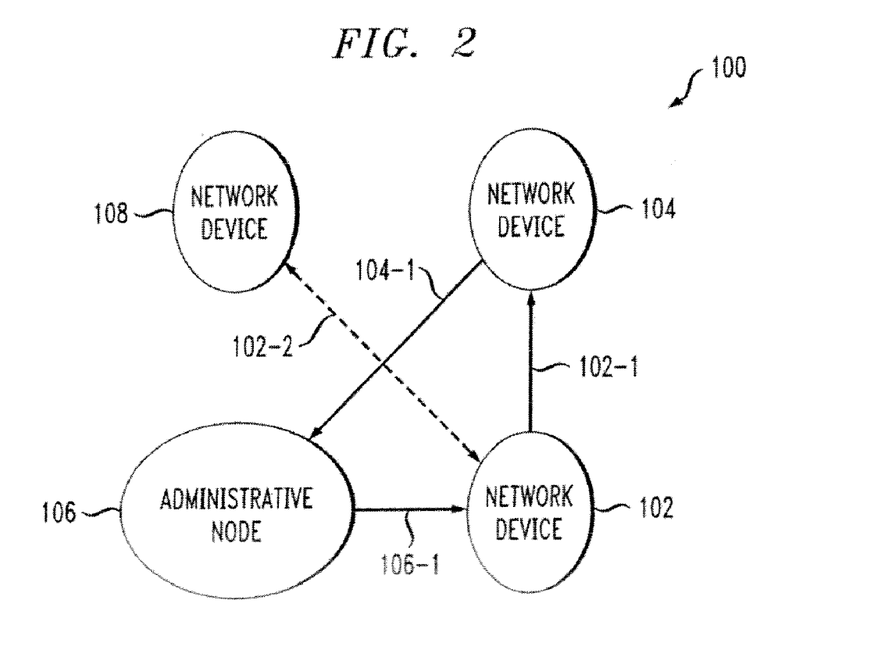
FIG. 2 is a schematic illustration of a network into which the present invention may be incorporated.

Referring now to the drawings wherein the showings are for purposes of illustrating the preferred embodiments of the invention only and not for purposes of limiting same, FIG. 2 provides a view of a network into which exemplary embodiments of the present invention may be incorporated. As shown, a network 100 includes a new network device 102 that is being incorporated into the network 100 and, consequently, requires registration and administrative attention from the network 100. Also shown is an existing network device 104 and an administrative node 106. Another existing network device 108 is additionally illustrated.

In the network 100, incorporation of the new network device 102 according to the objectives of the present invention includes the new network device 102 being provided with a network address of an existing network node, such as that of network device 104, which may or may not be an administrative node. The functionality of an administrative node is desired in this situation so that the new network device 102 can appropriately register on the network 100. In this case, a request for registration (at 102-1) is sent from the new network device 102 to the existing network device 104. In this case, the network device 104 does not include administrative services so it, therefore, forwards the request (at 104-1) to administrative node 106. The administrative node 106, after successfully registering the new network device 102 on the network 100, then sends a message indicating successful registration (at 106-1) to the network device 102. The network device 102 is then free to provide services to the network, including to existing network device 108 (at 102-2).

Each of the network devices 102, 104 and 108, as well as administrative node 106, according to the present invention, may take a variety of forms. For example, these devices may take the form of switching elements, radio network controllers (RNCs), routers, or other well known network elements. Implementation of the present invention into these elements, however, provides the advantages that will be apparent from the description herein. It should also be recognized that the methods according to this invention can be accomplished using an appropriate combination of hardware and software routines and techniques that may be distributed throughout these network devices, as will be apparent to those of skill in the art. Of course, the precise configuration depends upon the actual network devices into which the embodiments of the invention are incorporated, as well as the protocols that are implemented.

It should be apparent from the brief description of the registration process above that this registration process is accomplished without direct access by the network device 102 to the administrative node 106. This demonstrates that the network device 102 may arbitrarily register with an existing non-administrative network node 104, and have its registration information forwarded to a known administrative node on the network, e.g. administrative node 106, in a non-hierarchical fashion. This system allows the new network node or device 102 to self-configure itself based on the network into which it is incorporated and the network devices that are already present on the network. It is implemented by utilizing multiple peer-to-peer networks for all communication. It does not require any single, centralized network node to initiate network communication.

Moreover, it should be apparent that the registration process occurs in a registration layer which is common to all network devices. Likewise, the administration process acts as a separate layer of the network and may or may not be present on all devices. Notably, the registration process and the administration process (which provides authentication and authorization mechanisms to control access to the network) may or may not share the same network interfaces. Each process substantially handles its communication to peer nodes without relying on the other process, although there may be some interaction and/or communication between the layers.

With respect to the administration services that may be provided to any of the network devices within the network 100, each network device has the ability to be given an administrative role if it has included therein the appropriate components. Administration may comprise network access administration as well as service administration. An existing administrative node may delegate administrative functions to a registered network device if it has the facilities to handle it in whole or in part based on subsets of administrative data.

The delegation of administrative functions includes: 1) transferring of all data required to function as an administrative node, 2) implementing data evolution rules to allow the new node to act as an independent administrative node without using identical data, 3) maintaining a communication channel to an existing administrative node to notify the existing node of administrative changes, and 4) providing service update notification to other network devices of a new administrative node.

Figure 6:
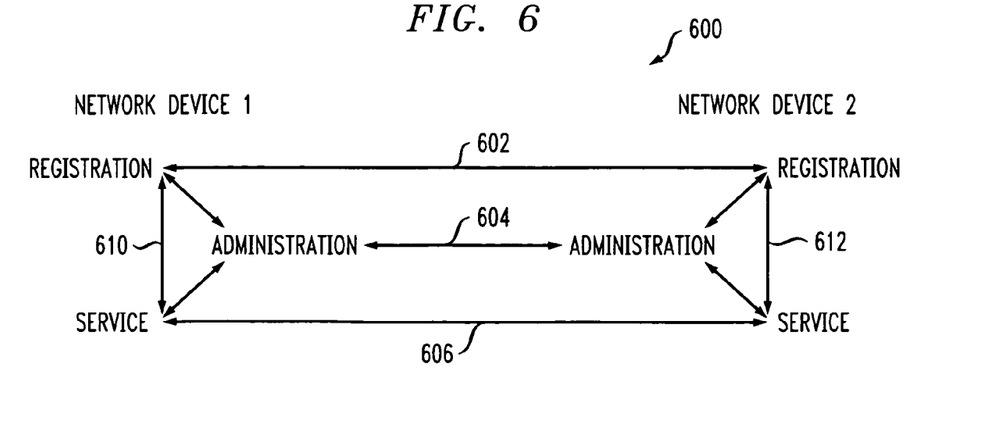

As noted above, registration process and administrative process occur in different layers of the network, and as will be demonstrated below, are preferably implemented sequentially, with registration occurring before transferred administrative data. In this regard, referring to FIG. 6, the layers between a network device 102 and a network 104 are illustrated. For example, registration layer 602 is shown between the two devices. Likewise, an administration layer 603 and a service layer 606 are provided. Also illustrated by designation 610 and 612 are selected interactions between the layers.

In addition, once the new network device is registered and is provided with administrative functions, if any, it is operable to perform service processes as required by the manufacturer. Ironically, the administration process is one such service. The service processes could include maintaining subscriber databases or media storage, for example, and function independently from the registration and administration processes once the network device is registered and operable. Services themselves may also provide administrative roles such as user verification, but it may or may not be independent of the administrative process as required by the service.

As noted above, the features of the present invention may be implemented using appropriate software and hardware techniques. This is illustrated in the call flow diagram of FIG. 3. As shown, a call flow 300 shows the communication messages that are exchanged between various components of the exemplary network in an exemplary fashion. As above, the components include a new network device 102, an existing network device 104, an administrative node 106, and another existing network device 108. As shown, the new network device 102 sends a registration request to the existing network device 104 (at 302). If the existing network device 104 includes suitable administrative capabilities, it can successfully register in the new network device 102 on the network and send a registration acknowledgement back to the new network device 102 (at 304). If, however, the existing network device 104 does not include, or is not operative to perform, administrative functionality that would allow it to register the new network device 102, it forwards the administration request to the administrative node 106 (at 306). Once the new network device 102 is successfully registered by the administrative node 106, a registration acknowledgement is sent back to the new network device 102 (at 308).

Figure 3:
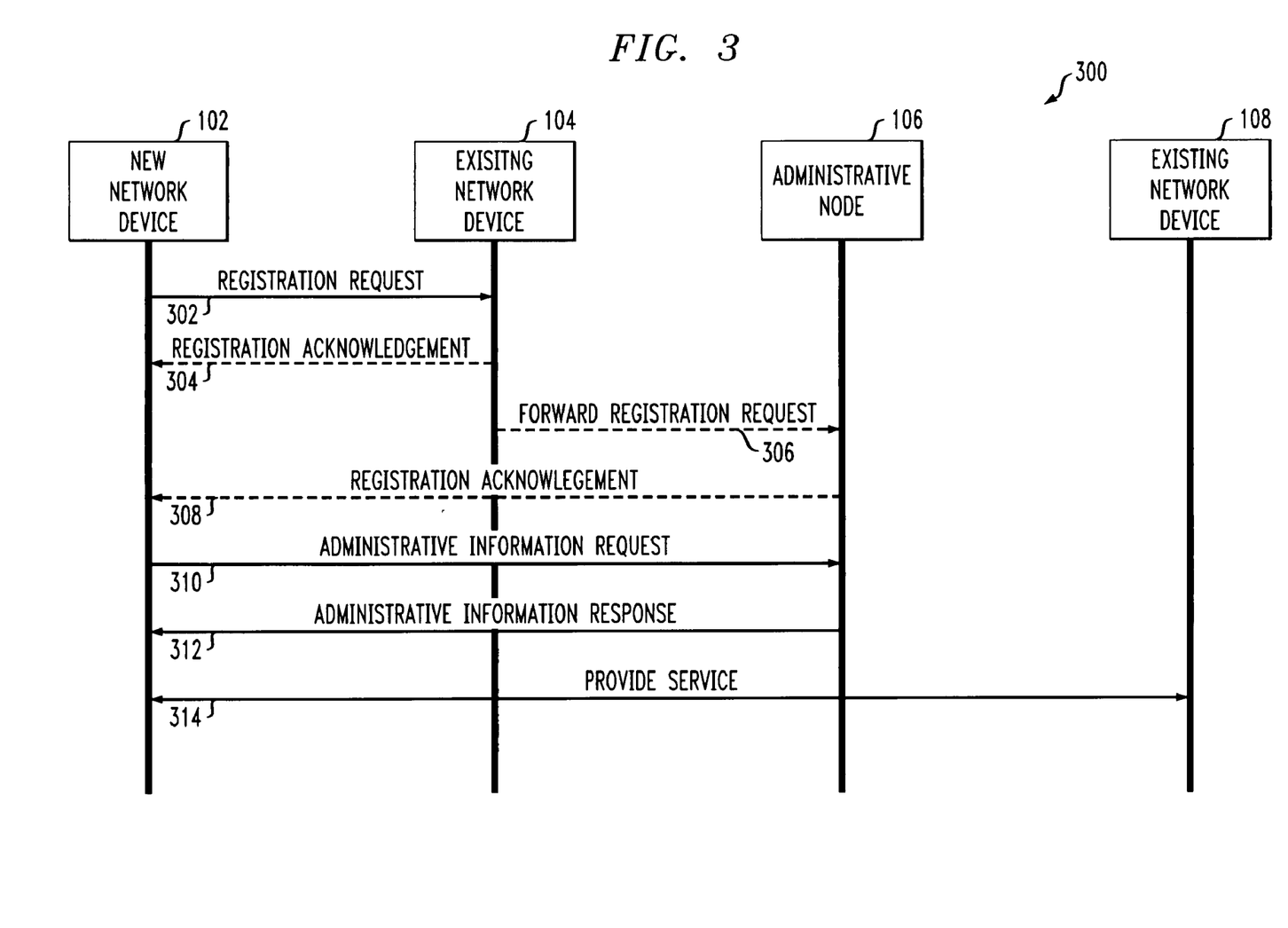
FIG. 3 is a call flow diagram according to embodiments of the present invention.

The new network device 102 can then request administrative information from the administrative node 106 (at 310). The administrative node 106 then responds with the administration information (at 312). The exchange of administration information will vary as will be described in more detail below. However, it may well be that the information provided allows the new network device to now provide service to the network, including to the network device 108 of FIG. 2 (at 314).

The call flow of FIG. 3 illustrates an exemplary network and an exemplary operation of the implementation of embodiments of the present invention. It should be appreciated that the actual form of the message will vary depending on the network protocols that are used, as well as the network components that are implemented. Of course, those of skill in the art will appreciate that, for example, a registration request may take a variety of different forms, depending on those parameters. Any such form is not intended, however, to limit the invention here.

As noted above, the new network device, such as new network device 102, requires registration on the network as well as selected administrative processing. Preferably, the registration process is run and completed before the administrative processing is accomplished.

Figure 4:
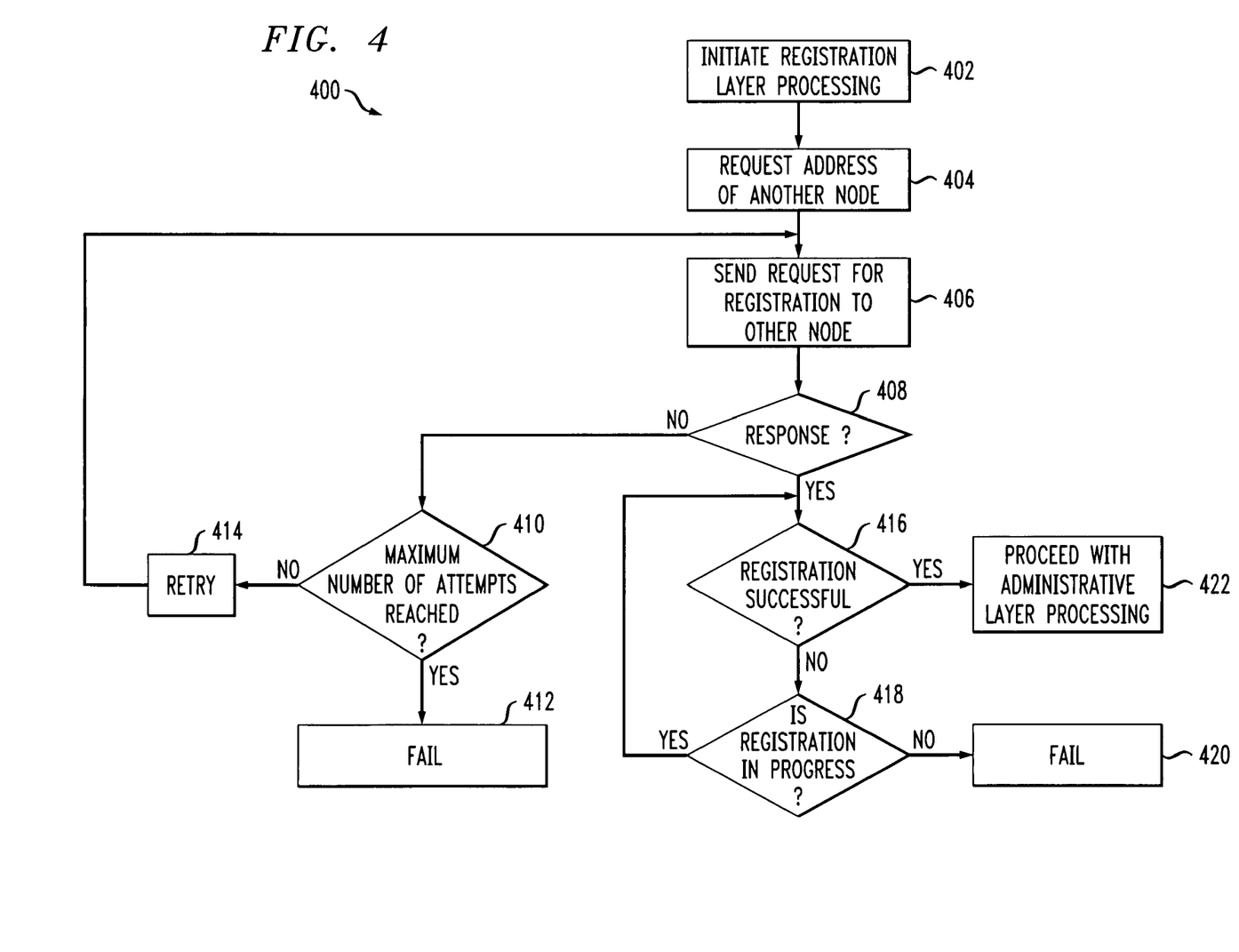
FIG. 4 is a flow chart illustrating a method according to embodiments of the present invention.

In this regard, referring now to FIG. 4, a method 400 for registration layer processing is illustrated. In this method, registration layer processing is initiated (at 402). An address of another node in the network is requested by the new network device (at 404). It should be understood, however, that this network address must be known by the new network device prior to its incorporation into the network. It will typically be provided (possibly with other addresses) to the new network device upon installation or initial configuration of the device prior to installation. Notably, the network address may be the address of any node on the network, not just administrative nodes.

The new network device then sends a request to the other network node, e.g. an existing network device such as network device 104, for registration (at 406). A counter indicating the number of attempts may also be incremented. The new network device then waits for a response to be received (at 408). If no response is received, in one form of the invention, the new network device determines whether a maximum number of attempts to register has been exceeded based on, for example, the counter noted (at 410). As noted, this counter is incremented in 406. A maximum threshold may also be suitably stored to make the determination at 410. If the maximum number of attempts has been reached, the registration process is deemed to have failed (at 412). After failure, the whole process may be restarted. In doing so, a new address for another may be requested. The new address may also have been previously stored. If the registration process has not reached its maximum number of attempts, a retry is accomplished (at 414). In doing so, of course, a request is again sent to the other node and the steps 406, 408, and related steps, are performed.

If a response is received, the new network device determines if the received response indicated that registration was successful (at 416). If not, a determination is made as to whether the received response indicated that registration was in progress (at 418). If registration was not successful and is not in progress, then the registration process is deemed to have failed (at 420). After failure, the whole process may be restarted. In doing so, a new address for another may be requested. The new address may also have been previously stored. If, however, the registration is still in progress, the system simply waits until registration is successful. Once it is determined that registration is successful, the new network device proceeds with administrative layer processing (at 422).

The flow chart of FIG. 4 is formulated substantially from the perspective of the new network device 102. However, from the perspective of the receiving node, such as network node 104 or administrative node 106, the processes include simply processing the request for registration. This occurs if the receiving node includes appropriate administrative functions to do so. If, however, the receiving node does not include such functions, it simply forwards the registration request to a known administrative node that can implement the administrative functions of registration. This administrative node performing the registering function will then communicate directly with the new network device. In the end, from either perspective, the new network device is successfully registered on the network.

Figure 5:
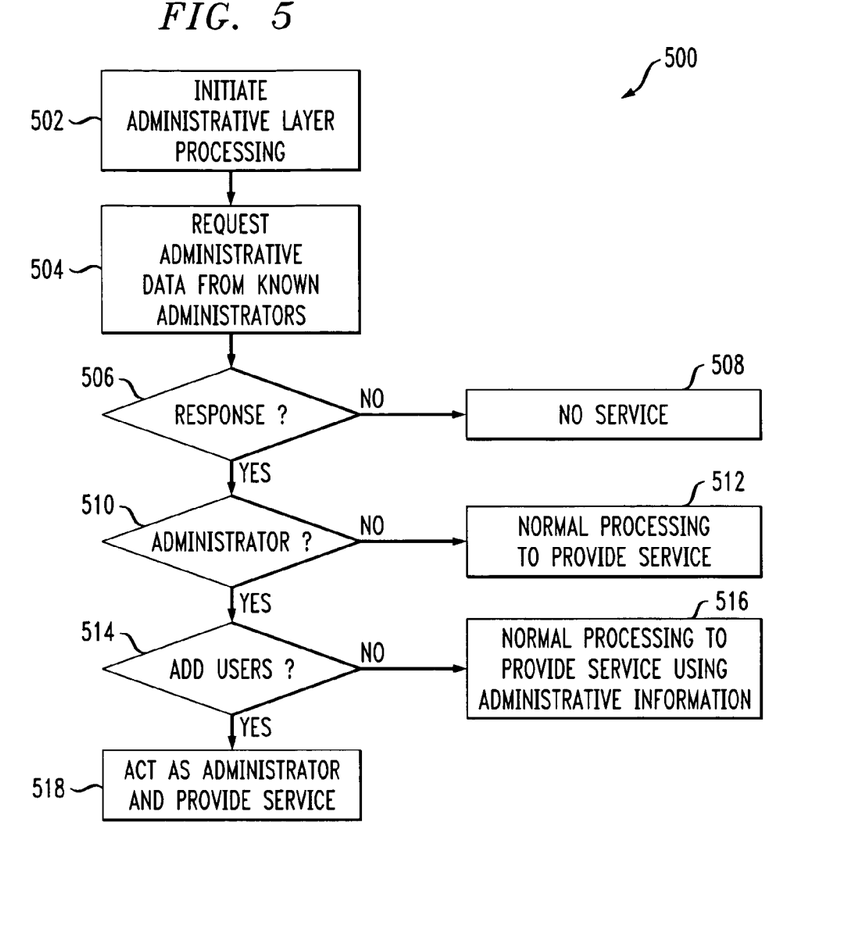
FIG. 5 is a flow chart illustrating a method according to embodiments o the present invention; and, FIG. 6 is a diagram illustrating various network layers according to the present invention.

Referring now to FIG. 5, a method for administrative layer processing is described. Initially, it should be understood, that administrative information includes information on the services being provided in the network, as well as the identity of the network devices that control those services. The subject administrative information also includes information as to identities of devices that can access other devices and information on which devices can use which services.

Referring back to FIG. 5, the process is begun by initiating administrative layer processing (at 502). The new network device 102 then requests administrative data from known administrative nodes (at 504). The administrative nodes are known to the new network device because this information is provided in the message acknowledging successful registration of the new network device. Of course, multiple administrative devices may be identified in that data set. The new network device 102 may then broadcast a request for administrative data or information to all known administrative nodes. Such a broadcast would include a request for information on specific services. Alternatively, the new network device 102 may simply send requests to administrative nodes that are selected based on services that are provided. In either case, the request takes a form that is suitable for the protocols being used and the network devices being implemented. Typically, data fields will be available in the messaging schemes to allow for requests and suitable responses, including responses that convey amounts of data.

With respect to responses, the new network device 102 waits for a response to be received (at 506). If no response is received within a predetermined time period, no service can subsequently be provided (at 508). If, however, a response is received, the new network device 102 must determine if the information received in the response allows the new network device to be operative as an administrator (at 510). If not, normal processing to provide services is accomplished (at 512). If the new device is rendered operative to be an administrator (or administrative node or device), based on the information received, a determination is made as to whether information received allows the new device 102 to act as an administrator that can add or register users (at 514). If not, normal processing to provide services using selected administrative information is accomplished (at 516). If, however, the new network device 102 determines that the information it received renders it operative to serve as an administrator that can add users, the new network device 102 subsequently act as an administrative node and provides services as designed (at 518).

It should be understood that the use of administrative information may be necessary to provide services within the network at various levels and for various advantageous purposes. However, it should also be understood that providing information to the new network device that renders it operative to serve as an administrator that can add users will only occur, for all practical purposes, in a relatively few instances. The reason is that most network providers would not want to lose control of the number and identity of users on its network. Nonetheless, the provision of administrative functions, absent the privilege of adding users, is a notable improvement over that which is known and will allow for efficient peer-to-peer network functioning.

An additional privilege that is independent of the privilege of adding users may be the delegation of administrative function. Simply being an administrator may be useful from a network efficiency perspective by distributing the administrative function, without losing the control of administrators, by also giving out the privilege of delegation. This may be considered an administrative function—just like the privilege of "adding users".

It will also be appreciated that providing administrative information in this manner allows all network device provisioning to occur utilizing data already on the network, instead of pre-provisioning the device. This allows for a more realistic configuration, as opposed to providing data that is outdated. The data transfers that occur as a result of the provision of administrative data can be transfers involving a relatively large amount of data or transfers involving a relatively small amount of data. Either situation is effectively dealt with by the network—inasmuch as such transfers are already conducted for other known purposes.

When copying data from one network device to another, some of the data may require modification. For example, if the data represents, for example, identification of a certain type of network device in a listing, it may need to be modified to now include in the list the device from which the data came. Such data transformations are routinely conducted in other contexts, such as when routing data is copied from one device to another in the known pre-provisioning steps. The evolution of data while delegating administrative functions, in connection with the present invention, allows transformation of data to be related to the device from which it came and provide for overall improved configuration.

It should be understood that data transformations may also be performed in connection with processing the registration layer and/or providing services to the network. With respect to providing services, if routing is the service, as noted above, apparent modifications will be made so that the proper perspective of the devices are taken into account.

As to the services that are provided in this network, it will be appreciated that such services may take a variety of well known forms. At least some of these well known forms, however, may now be provided in a peer-to-peer environment. In the overall environment according to these exemplary embodiments, a peer-to-peer registration network is configured in one layer, a peer-to-peer administrative network is configured in another layer, and selective peer-to-peer services are provided in still another layer.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method for incorporating a new network device into a network comprising:
    sending a request for registration by the new network device to a second network device;
    determining whether the second network device is operative to register the new network device on the network;
    registering the new network device on the network by the second network device if a determination is made that the second network device is operative to register the new network device on the network;
    forwarding the request for registration to a third network element if the second network element is inoperative to register the new network device on the network, the third network device being operative to register the new network device on the network;
    registering the new network device on the network by the third network device;
    sending an acknowledgement of successful registration to the new network device by the third network device, the acknowledgement including information on other network devices that are operative to perform administrative functions;
    requesting administrative information by the new network device from selected ones of the other network devices that are operative to perform administrative functions;
    providing the administrative information to the new network device;
    determining, by the new network device, whether the administrative information allows the new network device to operate as an administrator;
    initiating, by the new network device, normal processing to provide services, if the administrative information does not allow the new network device to operate as an administrator;
    determining, by the new network device, whether the administrative information allows the new network device to add users to the network, if the administrative information allows the new network device to operate as an administrator;
    initiating, by the new network device, normal processing to provide administrative services, if the administrative information allows the new network device to operate as an administrator but not add users to the network; and
    providing, by the new network device, administrative services that comprise adding users to the network, if the administrative information allows the new network device to operate as an administrator and add users to the network.

2. A system for incorporating a new network device into a network comprising:
    means for sending a request for registration to a second network device;
    means for determining whether the second network device is operative to register the new network device on the network;
    means for registering the new network device on the network by the second network device if a determination is made that the second network device is operative to register the new network device on the network;
    means for forwarding the request for registration to a third network element if the second network element is inoperative to register the new network device on the network, the third network device being operative to register the new network device on the network;
    means for registering the new network device on the network by the third network device;
    means for sending an acknowledgement of successful registration to the new network device by the third network device, the acknowledgement including information on other network devices that are operative to perform administrative functions;
    means for requesting administrative information by the new network device from selected ones of the other network devices that are operative to perform administrative functions;
    means for providing the administrative information to the new network device;
    means for determining whether the administrative information allows the new network device to operate as an administrator;
    means for initiating normal processing to provide services, if the administrative information does not allow the new network device to operate as an administrator;
    means for determining whether the administrative information allows the new network device to add users to the network, if the administrative information allows the new network device to operate as an administrator;

means for initiating normal processing to provide administrative services, if the administrative information allows the new network device to operate as an administrator but not add users to the network; and means for providing administrative services that comprise adding users to the network, if the administrative information allows the new network device to operate as an administrator and add new users to the network.

3. A network comprising:

a first network device operative to send a request for registration to a second network device;

a second network device operative to determine whether the second network device is operative to register the first network device on the network if a determination is made that the second network device is operative to register the first network device on the network, and forward the request for registration to a third network element if the second network element is inoperative to register the first network device on the network; and, a third network device operative to register the first network device on the network and send an acknowledgement of successful registration to the first network device, wherein the first network device is operative to request administrative information from other network devices that are operative to perform administrative functions; receive the administrative information; determine whether the administratve information allows the new network device to operate as an administrator; initiate normal processing to provide services, if the administrative information does not allow the new network device to operate as an administrator; determine whether the administrative information allows the new network device to add users, if the administrative information allows the new network device to operate as an administrator; initiate normal processing to provide administrative services, if the administrative information allows the new network device to operate as an administrator but not add users; and provide administrative services that comprise adding new users, if the administrative information allows the new network device to operate as an administrator and add new users.

4. The network as set forth in claim 3 wherein the first network device is operative to request administrative information from selected other network devices that are operative to perform administrative functions.

5. The network as set forth in claim 4 wherein the request for administrative information is based on the acknowledgement, the acknowledgement including information on the other network devices that are operative to perform administrative functions.

6. A method for incorporating a first network device into a network comprising:

sending a request for registration by the first network device to a second network device;

determining whether the second network device is operative to register the first network device on the network;

registering the first network device on the network by the second network device if a determination is made that the second network device is operative to register the first network device on the network;

forwarding the request for registration to a third network element if the second network element is inoperative to register the first network device on the network, the third network device being operative to register the first network device on the network;

registering the first network device on the network by the third network device;

sending an acknowledgement of successful registration to the first network device by the third network device;

determining, by the first network device, whether the administrative information allows the first network device to operate as an administrator;

initiating, by the first network device, normal processing to provide services, if the administrative information does not allow the first network device to operate as an administrator;

determining, by the first network device, whether the administrative information allows the first network device to add users, if the administrative information allows the first network device to operate as an administrator;

initiating, by the first network device, normal processing to provide administrative services, if the administrative information allows the first network device to operate as an administrator but not add users; and providing, by the first network device, administrative services that comprise adding new users, if the administrative information allows the first network device to operate as an administrator and add new users.

* * * * *